United States Patent [19]

deTorres

[11] 4,225,687

[45] Sep. 30, 1980

[54] NOVEL HALOBISPHENOLETHYLENE POLYCARBONATE-POLYETHERAMIDE-IMIDE BLENDS

[75] Inventor: Pablo D. deTorres, Louisville, Ky.

[73] Assignee: General Electric Company, Schenectady, N.Y.

[21] Appl. No.: 59,663

[22] Filed: Jul. 23, 1979

[51] Int. Cl.$^2$ ............................................. C08L 77/00
[52] U.S. Cl. ................................. 525/423; 525/433; 528/202
[58] Field of Search ............................... 525/433, 423

[56] References Cited

U.S. PATENT DOCUMENTS

| | | | |
|---|---|---|---|
| 3,210,438 | 10/1965 | Chapman | 525/433 |
| 3,431,224 | 3/1969 | Goldblum | 525/433 |
| 3,770,697 | 11/1973 | Holub | 525/433 |
| 3,946,090 | 3/1976 | Margotte | 525/433 |
| 3,951,910 | 4/1976 | Mark | 525/433 |
| 4,073,814 | 2/1978 | Kinson | 260/590 D |

FOREIGN PATENT DOCUMENTS 48893 12/1964 Poland .

OTHER PUBLICATIONS

Sobiczewski, Z. et al., Chemical Abstracts, vol. 69, (1968), No. 3301j.
Wielgosz, Z. et al., Chemical Abstracts, vol. 77, (1972), No. 20082w.
Factor, A., Chemical Abstracts, vol. 87, (1977), No. 202627s, Ger. Offen No. 2,709,387.
Kinson, P. et al., Chemical Abstracts, vol. 88, (1978), No. 23882v, Ger. Offen No. 2,709,389.

*Primary Examiner*—Paul Lieberman
*Attorney, Agent, or Firm*—F. Wesley Turner; James C. Davis, Jr.; Joseph T. Cohen

[57] ABSTRACT

This invention is concerned with a new class of halobisphenolethylene polycarbonate-polyetheramide-imide blends. More particularly, the invention is concerned with halobisphenolethylene polycarbonate-polyetheramide-imide blends which exhibit enhanced physical and/or chemical properties. The halobisphenolethylene polycarbonate-polyetheramide-imide blends are suitable for the manufacture of filaments, fibers, films, sheets, laminates and articles of manufacture including reinforced articles by conventional manufacturing techniques.

11 Claims, No Drawings

NOVEL HALOBISPHENOLETHYLENE POLYCARBONATE-POLYETHERAMIDE-IMIDE BLENDS

CROSS-REFERENCES TO RELATED APPLICATIONS

This invention is related to copending U.S. patent applications which contain subject matter incorporated herein by reference in its entirety, i.e. Ser. Nos. 52,279 (Kinson) and 51,766 (Thomas) filed Jun. 26 and 25, 1979 respectively; and Ser. No. 830,860 (Kinson et al.) filed Sept. 6, 1977 a continuation-in-part of Ser. No. 672,415 filed Mar. 31, 1976 now abandoned.

BACKGROUND OF THE INVENTION

1. Field of the Invention

This invention relates to a new class of halobisphenolethylene polycarbonate-polyetheramide-imide blends.

2. Description of the Prior Art

The prior art has made limited observations regarding the properties of chlorobisphenolethylene polycarbonates such as the infra-red spectroscopic data by Z. Wielgosz, Z. Boranowska and K. Janicka, reported in *Plaste und Kautschuk* 19 (12) 902 (1972). Observations regarding attempts to stabilize chlorobisphenolethylene polycarbonates are reported by Z. Gobiczewski, Z. Wielgosz and K. Janicka in *Plaste und Kautschuk* 16 (2) 99 (1969).

DESCRIPTION OF THE INVENTION

This invention embodies halobisphenolethylene polycarbonate-polyetheramide-imide blends.

As used herein and in the appended claims, the term "halobisphenolethylene polycarbonate" includes any polycarbonate composition containing within the polycarbonate skeletal backbone "halobis(phenyl)ethylene carbonate" units of the formula:

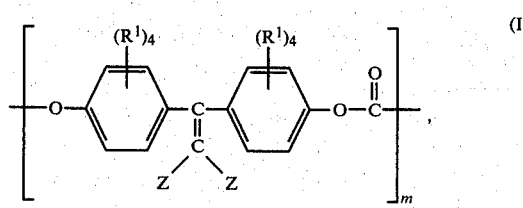

where independently each $R^1$ is hydrogen, chlorine, bromine, or a $C_{1-30}$ monovalent hydrocarbon or hydrocarbonoxy, each Z is hydrogen, chlorine, or bromine, subject to the proviso that at least one Z is chlorine or bromine, and m is an integer of at least 2. Presently preferred monovalent hydrocarbon groups are $C_{1-4}$ alkyl or phenyl. More preferred polycarbonates contain units of formula I, wherein each $R^1$ is hydrogen and each Z is chlorine. Polycarbonates containing only recurring moieties of formula I are "halobisphenolethylene homopolycarbonates" as defined herein in the appended claims.

Included within the scope of this invention are halobisphenolethylene polycarbonates containing both halobis(phenyl)ethylene carbonate units of formula I as well as "arene carbonate" units of the formula:

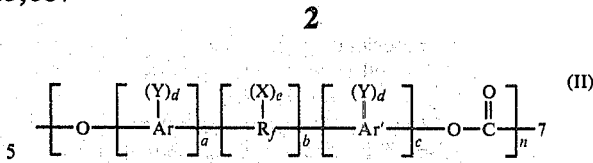

wherein $R_f$ is an alkylene, alkylidene, cycloalkylene, cycloalkylidene or arylene linkage or a mixture thereof, a linkage selected from the group consisting of ether, carbonyl, amine, a sulfur or phosphorus containing linkage, Ar and Ar' are arene radicals, Y is a substituent selected from the group consisting of organic, inorganic and organometallic radicals, X is a monovalent hydrocarbon group selected from the class consisting of alkyl, aryl and cycloalkyl and mixtures thereof, d represents a whole number of at least 0 up to a maximum equivalent to the number of replaceable hydrogens substituted on the aromatic rings comprising Ar or Ar', e represents a whole number of from 0 to a maximum controlled by the number of replaceable hydrogens on $R_f$, a, b and c represent whole numbers including 0, when b is not zero, neither a or c may be zero, otherwise either a or c but not both may be 0, when b is zero, the aromatic groups can be joined by direct carbon bonds and wherein n is an integer of at least 1.

Preferred copolycarbonates included within the scope of this invention are polycarbonates containing both the halobis(phenyl)ethylene carbonate units of formula I as well as arene carbonate units of the formula:

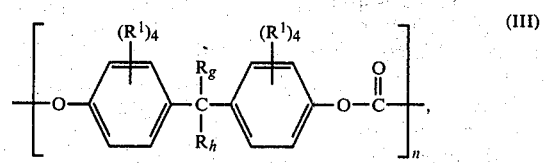

wherein independently each $R^1$ is hydrogen, chlorine, bromine or a $C_{1-30}$ monovalent hydrocarbon group, independently $R_g$ and $R_h$ are hydrogen or a $C_{1-30}$ monovalent hydrocarbon group and n is an integer of at least 2. Presently preferred monovalent hydrocarbon groups are $C_{1-4}$ alkyl or phenyl. More preferred copolycarbonates contain bisphenyl carbonate units of formula III wherein each $R^1$ is hydrogen and $R_g$ and $R_h$ are methyl.

Halobisphenolethylene polycarbonates can be prepared by methods known to those skilled in the art such as those described by S. Porejko et al., Polish Pat. No. 48,893, issued Dec. 12, 1964, entitled *Process for Synthesizing Self-Extinguishing Thermoplastics* and Z. Wielgosz et al., *Polimery* 17, 76 (1972). In general, the S. Porejko et al. and Z. Wielgosz et al. methods describe reactions of a chlorobisphenolethylene, i.e. 1,1-dichloro-2,2-bis(4-hydroxyphenyl)ethylene and bisphenol-A, i.e. bis(4-hydroxyphenyl)-propane-2,2 mixture with a carbonate precursor, e.g. phosgene and an acid acceptor, e.g. caustic soda and a catalyst, e.g. triethylamine, wherein the reactions are carried out under conventional phosgenating reaction conditions, i.e. reaction conditions generally associated with the phosgenation of bisphenol-A as described in the Encyclopedia of Polymer Science and Technology 10 entitled *Polycarbonates*, pages 710–764, Interscience Publishers (1969).

Illustrative of some halobisphenolethylenes that can be employed in the preparation of homo- and co-polycarbonates in accordance with the phosgenating reaction conditions described by S. Porejko et al. and Z. Wielgosz et al. as well as those described in the Encyclopedia of Polymer Science follow:

1,1-dibromo-2,2-bis(4-hydroxyphenyl)ethylene;
1,1-dichloro-2,2-bis(5-methyl-4-hydroxyphenyl)ethylene;
1,1-dibromo-2,2-bis(3,6-n-butyl-4-hydroxyphenyl)ethylene;
1,1-dichloro-2,2-bis(2-chloro-5-ethyl-4-hydroxyphenyl)ethylene;
1,1-dibromo-2,2-bis(2,5-dibromo-4-hydroxyphenyl)ethylene;
1-bromo-2,2-bis(4-hydroxyphenyl)ethylene;
1-chloro-2,2-bis(3,5-di-isopropyl-4-hydroxyphenyl)ethylene;
1-bromo-2,2-bis(2,6-di-t-butyl-4-hydroxyphenyl)ethylene;
1-chloro-2,2-bis(2,6-dichloro-4-hydroxyphenyl)ethylene;
1-bromo-2,2-bis(2,3-dibromo-4-hydroxyphenyl)ethylene;
1,1-dichloro-2,2-bis(3,5-dichloro-4-hydroxyphenyl)ethylene;
1,1-dichloro-2,2-bis(3,5-dibromo-4-hydroxyphenyl)ethylene;
1,1-dibromo-2,2-bis(5-chloro-4-hydroxy)ethylene;
1-chloro-2,2-bis(3,6-dibromo-4-hydroxyphenyl)ethylene;
1-bromo-2,2-bis(2-chloro-4-hydroxyphenyl)ethylene;
1,1-dichloro-2,2-bis(2,3,5-trichloro-4-hydroxyphenyl)ethylene;
1,1-dibromo-2,2-bis(2,3,5,6-tetrabromo-4-hydroxyphenyl)ethylene;
1-chloro-2,2-bis(3-phenyl-4-hydroxyphenyl)ethylene;
1-bromo-2,2-bis(3,5-diphenyl-4-hydroxyphenyl)ethylene;
1,1-dichloro-2,2-bis(2,6-diphenyl-4-hydroxyphenyl)ethylene;
1,1-dibromo-2,2-bis(3-bromo-5-phenyl-4-hydroxyphenyl)ethylene;
1-chloro-2,2-bis(3-methoxy-4-hydroxyphenyl)ethylene;
1-bromo-2,2-bis(3,5-dimethoxy-4-hydroxyphenyl)ethylene;
1,1-dichloro-2,2-bis(2-ethoxy-4-hydroxyphenyl)ethylene;
1,1-dibromo-2,2-bis(2,6-diethoxy-4-hydroxyphenyl)ethylene;
1-chloro-2,2-bis(5-phenylether-4-hydroxyphenyl)ethylene;
1-bromo-2,2-bis(3,5-diphenylether-4-hydroxyphenyl)ethylene;
1,1-dichloro-2,2-bis(3-chloro-5-phenylether-4-hydroxyphenyl)ethylene;
1,1-dibromo-2,2-bis(2-bromo-5-phenylether-4-hydroxyphenyl)ethylene; etc.,
among many others.

Illustrative of some arene dihydroxy compounds that can be employed in the preparation of halobisphenolethylene copolycarbonates or in the preparation of other polycarbonates that contain arene carbonate units of formulas II and III—other polycarbonates that can be combined with the halobisphenolethylene polycarbonate-polyetheramide-imide blends of this invention—follow:
resorcinol;
4,4'-dihydroxy-diphenyl;
1,6-dihydroxy-naphthalene;
2,6-dihydroxy-naphthalene;
4,4'-dihydroxy-diphenyl methane;
4,4'-dihydroxy-1,1-ethane;
4,4'-dihydroxy-diphenyl-1,1-butane;
4,4'-dihydroxy-diphenyl-1,1-isobutane;
4,4'-dihydroxy-diphenyl-1,1-cyclopentane;
4,4'-dihydroxy-diphenyl-1,1-cyclohexane;
4,4'-dihydroxy-diphenyl-phenyl methane;
4,4'-dihydroxy-diphenyl-2-chlorophenyl methane;
4,4'-dihydroxy-diphenyl-2,4-dichlorophenyl methane;
4,4'-dihydroxy-diphenyl-p-isopropylphenyl methane;
4,4'-dihydroxy-diphenylnaphthyl methane;
4,4'dihydroxy-diphenyl-2,2-propane;
4,4'-dihydroxy-3-methyl-diphenyl-2,2-propane;
4,4'-dihydroxy-3-cyclohexyl-diphenyl-2,2-propane;
4,4'-dihydroxy-3-methoxy-diphenyl-2,2-propane;
4,4'-dihydroxy-3-isopropyl-diphenyl-2,2-propane;
4,4'-dihydroxy-3,3'-dimethyl-diphenyl-2,2-propane;
4,4'-dihydroxy-3,3'-dichloro-diphenyl-2,2-propane;
4,4'-dihydroxy-diphenyl-2,2-butane;
4,4'-dihydroxy-diphenyl-2,2-pentane;
4,4'-dihydroxy-diphenyl-2,2(4-methyl pentane);
4,4'-dihydroxy-diphenyl-2,2-n-hexane;
4,4'-dihydroxy-diphenyl-2,2-nonane;
4,4'-dihydroxy-diphenyl-4,4-heptane;
4,4'-dihydroxy-diphenyl phenylmethyl methane;
4,4'-dihydroxy-diphenyl-4-chlorophenylmethyl methane;
4,4'-dihydroxy-diphenyl-2,5-dichlorophenylmethyl methane;
4,4'-dihydroxy-diphenyl-3,4-dichlorophenylmethyl methane;
4,4'-dihydroxy-diphenyl-4-fluorophenylmethyl methane;
4,4'-dihydroxy-diphenyl-2-naphthylmethyl methane;
4,4'-dihydroxy-tetraphenyl methane;
4,4'-dihydroxy-diphenyl phenylcyano methane;
4,4'-dihydroxy-diphenyl-1,2-ethane;
4,4'-dihydroxy-diphenyl-1,10-n-decane;
4,4'-dihydroxy-diphenyl-1,6(1,6-dioxo-n-hexane);
4,4'-dihydroxy-diphenyl-1,10(1,10-dioxo-n-decane);
bis-p-hydroxy-phenylether-4,4'-diphenyl;
$\alpha,\alpha,\alpha',\alpha'$-tetramethyl-$\alpha,\alpha'$-(di-p-hydroxyphenyl)-p-xylylene;
$\alpha,\alpha,\alpha',\alpha'$-tetramethyl-$\alpha,\alpha'$-(di-p-hydroxyphenyl)-m-xylylene;
2,2'-dihydroxy-3,3',5,5'-tetramethyldiphenyl methane;
4,4'-dihydroxy-3,3'-dimethyl-diphenyl methane;
4,4'-dihydroxy-2,2'-dimethyl-diphenyl methane;
4,4'-dihydroxy-3,3',5,5'-tetramethyl-diphenyl methane;
4,4'-dihydroxy-3,3'-dichloro-diphenyl methane;
4,4'-dihydroxy-3,3'-dimethoxy-diphenyl methane;
4,4'-dihydroxy-2,2',5,5'-tetramethyl-diphenyl methane;
4,4'-dihydroxy-2,2',3,3',5,5',6,6'-octamethyl-diphenyl methane;
4,4'-dihydroxy-2,2'-dimethyl-5,5'-diisopropyl-diphenyl methane;
4,4'-dihydroxy-2,2'-dimethyl-5,5'-dipropyl-diphenyl methane;
4,4'-dihydroxy-2,2'-dimethyl-5,5'-di-tert.-butyl-diphenyl methane;
4,4'-dihydroxy-diphenyl-5,5-nonane;
4,4'-dihydroxy-diphenyl-6,6-undecane;
4,4'-dihydroxy-diphenyl-3,3-butanone-2;
4,4'-dihydroxy-3,3'-dimethyl-diphenyl-3,3-butanone-2;
4,4'-dihydroxy-diphenyl-4,4-hexanone-3;
4,4'-dihydroxy-diphenylmethyl-4-methoxy-phenyl methane;
4,4'-dihydroxy-diphenyl ether;

4,4'-dihydroxy-diphenyl sulfide;
4,4'-dihydroxy-3,3'-dimethyldiphenyl sulfide;
4,4'-dihydroxy-diphenyl sulfoxide;
4,4'-dihydroxy-diphenyl sulfone;
4,4'-dihydroxy-3,3'-dichlorodiphenyl sulfone;
4,4'-dihydroxy-3,3',5,5'-tetramethyl-diphenyl methane;
4,4'-dihydroxy-3,3',5,5'-tetrachloro-diphenyl-1,1-cyclohexane;
4,4'-dihydroxy-3,3',5,5'-tetrachloro-diphenyl-2,2-propane;
4,4'-dihydroxy-3,3',5,5'-tetramethyl-2,2',6,6'-tetrabromo-diphenyl-2,2-propane; and
4,4'-dihydroxy-3,3',5,5'-tetrabromo-diphenyl-2,2-propane, etc., among many others.

Presently preferred halobisphenolethylene polycarbonates exhibit an intrinsic viscosity of at least 0.3 and more preferably about 0.5 deciliters per gram (dl./g.) as measured in either methylene chloride or chloroform or similar solvent systems at 25° C. The upper intrinsic viscosity number is not critical, however, it will generally be about 1.5 dl./g. Especially useful halobisphenolethylene polycarbonates generally have an intrinsic viscosity within the range of from about 0.38 to about 0.7 dl./g. Preferably, the halobisphenolethylene polycarbonates contain a sufficient number of repeating units of formulas I, or I and II or III, set out hereinbefore, to give a number average molecular weight of homo- or copolycarbonates—including blends thereof with other polycarbonates—of at least about 5,000, and more preferably a number average molecular weight of from about 10,000 to about 50,000. Polycarbonates of such molecular weight characteristics process easily inbetween about 450° F. and 650° F.

DESCRIPTION OF THE INVENTION

As used herein and in the appended claims, the term polyetheramide-imide includes any polyetheramide-imide of the empirical formula:

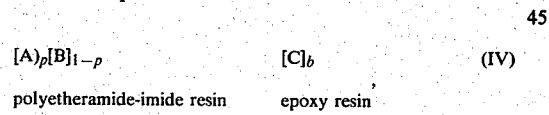

wherein A represents a polyamide (polyamic acid) structural unit of the polyetheramide-imide, B represents a polyimide structural unit of the polyetheramide-imide, wherein the polymer mole fraction p represents a number equal to or greater than zero, preferably a number less than about 0.5.

The A and B units of formula IV comprise, respectively, units of the following formulas:

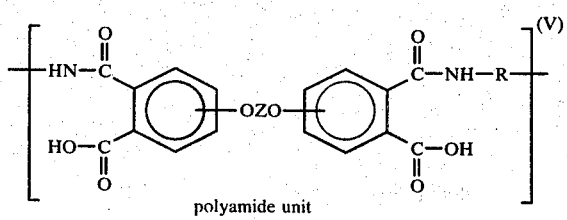

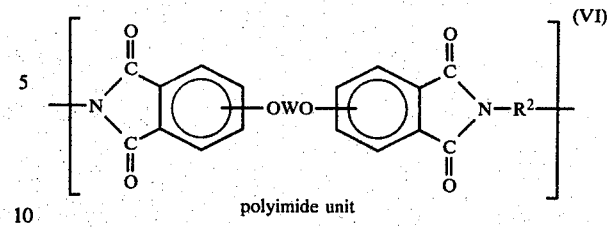

the O—W—O units of the polyamide or polyimide units can be in the 3 or 3' or 4 or 4' positions, e.g., in the 3,3'-, 3,4'-, 4,3'- or the 4,4'-positions, and W is a member of the class consisting of (1)

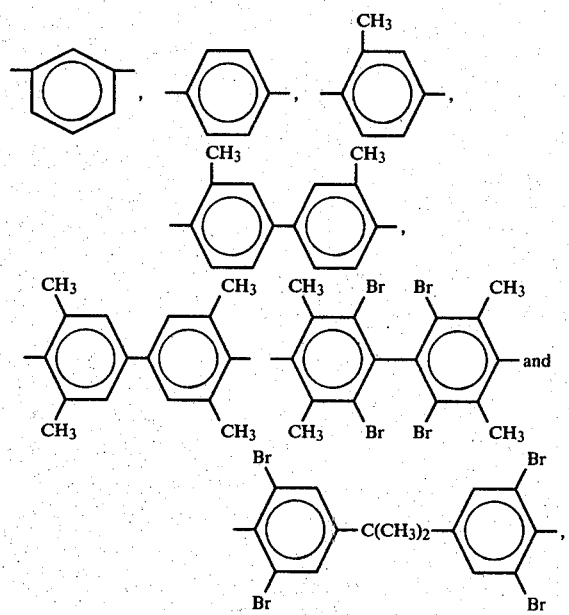

and (2) divalent organic radicals of the general formula

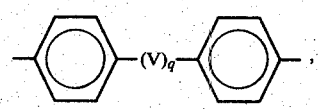

where V is a member selected from the class consisting of divalent radicals of the formulas

where q is 0 or 1, y is a whole number from 1 to 5, the divalent bonds of the —O—W—O— radical being situated on phthalic anhydride-derived units, and $R^2$ is a divalent organic radical selected from the class consisting of (a) aromatic hydrocarbon radicals having from 6–20 carbon atoms and halogenated derivatives thereof, (b) alkylene radicals and cycloalkylene radicals having from 2–20 carbon atoms, $C_{(2-8)}$ alkylene terminated polydiorganosiloxane, and (c) divalent radicals included by the formula

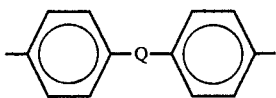

where Q is a member selected from the class consisting of

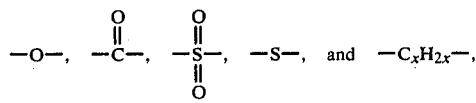

and x is a whole number from 1 to 5 inclusive.

As used herein and in the appended claims, the polyetheramide-imide compositions employed in the invention can have any degree of amidization or imidization, which is generally determined by their methods of preparation well-known to those skilled in the art. Generally useful polyetheramide-imide compositions have an intrinsic viscosity [$\eta$] greater than about 0.15 deciliters per gram, preferably from about 0.20 to about 0.35 deciliters per gram, or even higher as measured in N-methyl pyrrolidone (0.1 N in lithium bromide) at 25° C.

In general, the above-described polyetheramide-imides can be obtained by any of the methods well-known to those skilled in the art including the reaction of any aromatic bis(ether anhydride)s of the formula

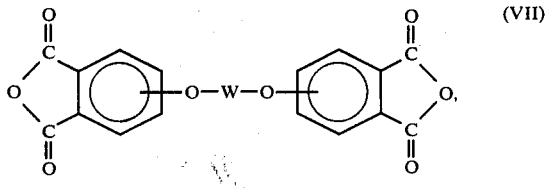

(VII)

where W is as defined hereinbefore with any diamino compound of the formula:

$$H_2N-R^2-NH_2,$$ (VIII)

where $R^2$ is as defined hereinbefore. Suitable methods include, in general, solution polymerization reactions that are advantageously carried out employing well-known solvents, e.g. tetrahydrofuran, o-dichlorobenzene/toluene mixtures, m-cresol/toluene mixtures, N-methyl pyrrolidone, dioxane/o-dichlorobenzene/toluene mixtures, N,N-dimethylformamide, etc., in which to effect interaction between the dianhydrides and the diamines at temperatures of from about 25° to about 60° C. Alternatively, the polyetheramide-imides can be prepared by melt polymerization of any dianhydride of Formula VII with any diamino compound of Formula VIII the ingredients at elevated temperatures with concurrent intermixing. Generally, melt polymerization temperatures between about 180° to about 350° C. preferably about 185° to about 300° C., and more preferably from about 190°-210° C. are employed. Any order of addition of chain stoppers ordinarily used in melt polymerization can be employed. The conditions of the reaction and the proportions of ingredients can be varied widely depending on the desired molecular weight, intrinsic viscosity, and solvent resistance. In general, equimolar amounts of diamine and dianhydride are employed, however, it is essential that a slight molar excess (about 1 to 10 mol percent) of an aliphatic or aromatic dianhydride be employed in order to effect the production of polyetheramide-imides having terminal anhydride groups.

Included among the many well-known methods of making polyetheramide-imides that can be employed in the practice of this invention are those disclosed in Heath et al. U.S. Pat. No. 3,847,867, Williams U.S. Pat. No. 3,847,869, Takekoshi et al. U.S. Pat. No. 3,850,885, White U.S. Pat. Nos. 3,852,242 and 3,855,178, etc. These disclosures are incorporated herein in their entirety by reference for the purpose of teaching, by way of illustration, general and specific methods for preparing polyetheramide-imides suited to the practice of this invention.

The aromatic bis(ether anhydride)s of Formula VII include, for example,
2,2-bis[4-(2,3-dicarboxyphenoxy)phenyl]propane dianhydride;
4,4'-bis(2,3-dicarboxyphenoxy)diphenyl ether dianhydride;
1,3-bis(2,3-dicarboxyphenoxy)benzene diarhydride;
4,4'-bis(2,3-dicarboxyphenoxy)diphenyl sulfide dianhydride;
1,4-bis(2,3-dicarboxyphenoxy)benzene dianhydride;
4,4'-bis(2,3-dicarboxyphenoxy)benzophenone dianhydride;
4,4'-bis(2,3-dicarboxyphenoxy)diphenyl sulfone dianhydride;
2,2-bis[4-(3,4-dicarboxyphenoxy)phenyl]propane dianhydride;
4,4'-bis(3,4-dicarboxyphenoxy)diphenyl ether dianhydride;
4,4'-bis(3,4-dicarboxyphenoxy)diphenyl sulfide dianhydride;
1,3-bis(3,4-dicarboxyphenoxy)benzene dianhydride;
1,4-bis(3,4-dicarboxyphenoxy)benzene dianhydride;
4,4'-bis(3,4-dicarboxyphenoxy)benzophenone dianhydride;
4-(2,3-dicarboxyphenoxy)-4'-(3,4-dicarboxyphenoxy)-diphenyl-2,2-propane dianhydride; etc.,
and mixtures of such dianhydrides.

Additional aromatic bis(ether anhydride)s also included by Formula VII are shown by Koton, M. M.; Florinski, F. S.; Bessonov, M. I.; Rudakov, A. P. (Institute of Heteroorganic Compounds, Acacdemy of Sciences, U.S.S.R.), U.S.S.R. No. 257,010, Nov. 11, 1969, Appl. May 3, 1967, and by M. M. Koton, F. S. Florinski, Zh Org. Khin, 4 (5), 774 (1968).

The organic diamines of Formula VIII include, for example,
m-phenylenediamine,
p-phenylenediamine,
4,4'-diaminodiphenylpropane,
4,4'-diaminodiphenylmethane,
benzidine,
4,4'-diaminodiphenyl sulfide,
4,4'-diaminodiphenyl sulfone,
4,4'-diaminodiphenyl ether,
1,5-diaminonaphthalene,
3,3'-dimethylbenzidine,
3,3'-dimethoxybenzidine,
2,4-bis($\beta$-amino-t-butyl)toluene,
bis(p-$\beta$-amino-t-butylphenyl)ether,
bis(p-$\beta$-methyl-o-aminopentyl)benzene,
1,3-diamino-4-isopropylbenzene,
1,2-bis(3-aminopropoxy)ethane,
m-xylylenediamine, p-xylylenediamine,
2,4-diaminotoluene,
2,6-diaminotoluene,
bis(4-aminocyclohexyl)methane,
3-methylheptamethylenediamine,
4,4-dimethylheptamethylenediamine,
2,11-dodecanediamine,
2,2-dimethylpropylenediamine,
octamethylenediamine,
3-methoxyhexamethylenediamine,
2,5-dimethylhexamethylenediamine,
2,5-dimethylheptamethylenediamine,
3-methylheptamethylenediamine,
5-methylnonamethylenediamine,
1,4-cyclohexanediamine,
1,12-octadecanediamine,
bis(3-aminopropyl)sulfide,
N-methyl-bis(3-aminopropyl)amine,
hexamethylenediamine,
heptamethylenediamine,
nonamethylenediamine,
decamethylenediamine,
bis(3-aminopropyl)tetramethyldisiloxane,
bis(4-aminobutyl)tetramethyldisiloxane, etc.,
and mixtures of such diamines.

Blends of halobisphenolethylene polycarbonates and polyetheramide-imide, as described hereinbefore, can be prepared by any means known to those skilled in the art. Preferred blends are prepared by heating admixtures of a halobisphenolethylene polycarbonates and polyetheramide-imide to a temperature above their softening point(s). Preferably, the mixing or blending is carried out—when carried out in the absence of a solvent—at the aforesaid elevated temperature, i.e. above their softening point(s), while subjecting the admixture to mechanical working. Accordingly, blends can be mixed with such equipment as extruders including mono- and multiple screw types, internal Banbury mixers, roll mills, or any other mechanical equipment which will subject the admixture to shear stresses at elevated temperatures.

In general, the halobisphenolethylene polycarbonate-polyetheramide-imide compositions of this invention can contain other ingredients such as reinforcing and nonreinforcing fillers, mold release agents, ultraviolet light stabilizers, antioxidants, drip retarding agents, surfactant agents, etc.

The halobisphenolethylene polycarbonates and polyetheramide-imide are combinable with each other in all proportions. Consequently, compositions comprising from 1 to 99%, by weight, halobisphenolethylene polycarbonate and from 99 to 1%, by weight, polyetheramide-imide are included within the scope of the invention. By controlling the proportions of halobisphenolethylene polycarbonate and polyetheramide-imide formulations having predetermined properties which are improved over those of either a halobisphenolethylene polycarbonate or a polyetheramide-imide alone are readily obtained. In general, blends of halobisphenolethylene polycarbonate and polyetheramide-imide have substantially enhanced flame retardancy values wherein nominal amounts 1 to 50%, by weight, of polyetheramide-imide are combined with 99 to 50%, by weight, of halobisphenolethylene polycarbonates, while still retaining or improving substantially the physical and chemical polymer property profile associated with the polyetheramide-imide component of the blends.

The following examples illustrate—but do not limit—the best method of practicing the invention. Unless otherwise indicated in the examples, the following general procedures were employed in the preparation and testing of the halobisphenolethylene polycarbonate-polyetheramide-imide blends. Deviations from the general procedure are noted in the specific examples.

GENERAL PROCEDURE

A series of blends of chlorobisphenolethylene polycarbonates and polyetheramide-imide were prepared from noncommercially available materials. The chlorobisphenol polycarbonate (abbreviated in the examples as bisphenol-E polycarbonate) was prepared by the reaction of an aqueous alkaline solution of 1,1-dichloro-2,2-bis(4-hydroxyphenyl)ethylene (prepared as described hereafter) with phosgene carried out in the presence of triethylamine and methylene chloride at a temperature range of from about 20° to about 40° C. to form high molecular weight chlorobisphenolethylene polycarbonates having an intrinsic viscosity as measured in methylene chloride at a temperature of 25.3° C. within the range of from about 0.41 to 0.54.

The 1,1-dichloro-2,2-bis(4-hydroxyphenyl)ethylene employed was prepared in accordance with the following detailed description: Under nitrogen, methanol (16.2 liters) was charged to a 10 gallon stainless steel reactor. Flake KOH (4098 gm., 85% solids, 62.1 moles) was added over 20 minutes with cooling to keep the temperature below 45° C. After cooling to 17° C., 1,1,1-trichloro-2,2-bis-(4-hydroxyphenylethane) (3804 l gm., 12 moles) was added as a powder. The stirred reaction mixture was then held at 27°-30° C. for 5 days (resulting in a starting material level of 3%) and then heated to reflux (75° C.) for two hours to lower the starting material level to several hundred ppm. After cooling to 25° C. the material was transferred under nitrogen to two 22 liter glass flasks and acidified to a pH of 5 with concentrated HCl (4320 ml.). The material was then split into two equal halves. One of the halves was then heated to near reflux and 7.5 liters of water at 75° C. was added. The resulting mixture was cooled to 25° C. over 3 hours and the resulting reaction product crystals were collected in a basket centrifuge and washed with 12 liters of water to dissolve and remove KCl which had also crystallized from the mother-liquor. The resulting product was redissolved in 4 liters of methanol, filtered through a 0.2 micron millipore filter, heated to 75° C. and 4 liters of hot water were added. After cooling, the crystals were collected in a basket centrifuge, washed with 4 liters of water, and dried in a vacuum oven at 100° C. to afford 150 gm., and 89% yield of product, i.e. 1,1-dichloro-2,2-bis(4-hydroxyphenyl)ethylene. Liquid chromotography analysis indicated less than 150 ppm. starting material. Product nitrogen content was less than 5 ppm. and iron was less than 0.5 ppm.

The polyetheramide-imide—characterized by dianhydride and diamino reactants—having an intrinsic viscosity [$\eta$] of 0.2-0.6 dl./gm. at 25° C. as measured in chloroform or N-methyl-pyrrolidone (NMP) depending upon the degree of imidization, and a glass-transition temperature $T_g$ of 140°-225° C. was prepared in accordance with the procedures described in U.S. Pat. No. 3,850,885 which procedures are incorporated herein by reference in their entirety.

The resulting bisphenol-E polycarbonate and polyetheramide-imide were powder blended into a series of compositions, extruded and chopped into pellets. The pelleted materials were injected or compression molded and tested accordingly:

Notched Izod Impact (1/i" specimens, ft.-lb. per inch of notch) ASTM D256 method A;

Oxygen Index ASTM D2863;

Tensile Yield Stress (psi) ASTM D1822; L specimen, 0.05"/min.;

Flexural Strength (psi) ASTM D790.

EXAMPLES 1-3

Bisphenol-E polycarbonate and polyetheramide-imide were blended and tested in accord with the description of the General Procedure. The results of the tests are tabulated in Table I set out hereafter.

TABLE I

Composition and Mechanical Properties of Bisphenol-E and Polyetheramide-imide

| Example No. | 1 | 2 | 3 |
|---|---|---|---|
| I. Blend Composition | | | |
| (a) bisphenol-E, phr (1) | 0 | 25 | 100 |
| (b) polyetheramide-imide, (2) phr | 100 | 75 | 0 |
| II. Physical Properties | | | |
| (a) notched Izod impact | 1.0 | 0.50 | 16.0 |
| (b) oxygen index | 47 | 70.2 | 54.8 |
| (c) tensile yield stress | 15,300 | 14,270 | 10,040 |
| (d) flexural strength | 21,000 | 22,280 | 16,340 |

(1) phr = parts per hundred of polycarbonate resin
(2) Polyetheramide-imide based on reaction of
(A) BPADA = Bisphenol A dianhydride, i.e. 2,2-bis[4-(3,4-dicarboxy phenoxy)-phenyl] propane, having the structural formula:

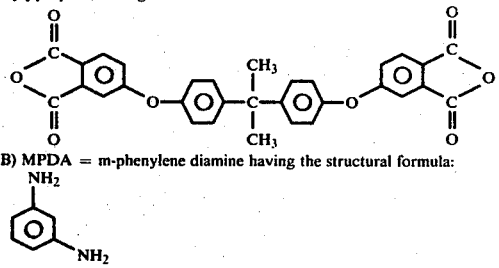

(B) MPDA = m-phenylene diamine having the structural formula:

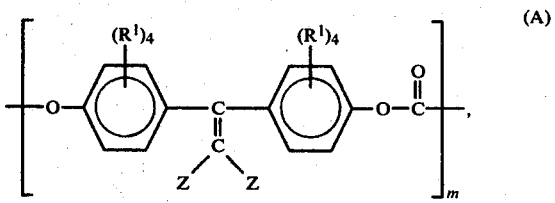

The halobisphenolethylene polycarbonate-polyetheramide-imide blends are suitable for the manufacture of filaments, fibers, films, sheets, laminates and articles of manufacture including reinforced articles by conventional manufacturing techniques.

It will be apparent to those skilled in the art that other changes and modifications can be made in the particular embodiments of the invention described herein and said modifications and embodiments are within the full intended scope of the invention as defined by the appended claims.

I claim:

1. A polymer blend comprising:
   (I) about 1-99 parts by weight of a polycarbonate containing halobis(phenyl)ethylene carbonate units of formula:

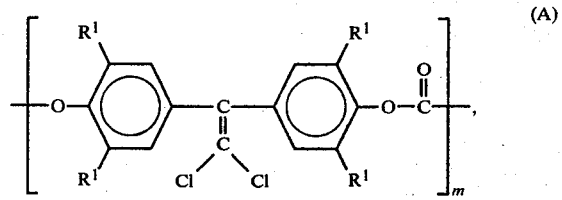

where independently each $R^1$ is hydrogen, chlorine, bromine or a $C_{1-30}$ monovalent hydrocarbon or hydrocarbonoxy group, each Z is hydrogen, chlorine or bromine, subject to the proviso that at least one Z is chlorine or bromine, and m is an integer of at least 2, and (II) about 99-1 parts by weight of a polyetheramide-imide.

2. A claim 1 composition, wherein (I) the polycarbonate units are of the formula:

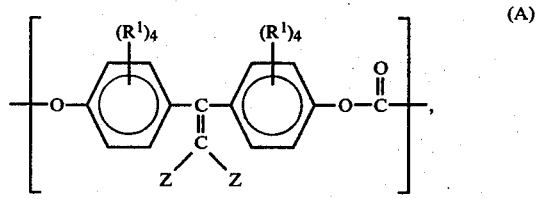

where independently each $R^1$ is hydrogen, chloride, bromine, $C_{1-4}$ alkyl or phenyl and m is an integer of at least 2.

3. The claim 2 composition, where (I) the polycarbonate unit $R^1$ substituents are hydrogen.

4. The claim 1 composition, wherein (I) the polycarbonate unit $R^1$ substituents are hydrogen, at least one Z substituent is chlorine and the other Z substituent is hydrogen.

5. The claim 1 composition, wherein the polycarbonate of (I) contains (a) about 1-100 parts by weight of halobis(phenol)ethylene polycarbonate units of the formula:

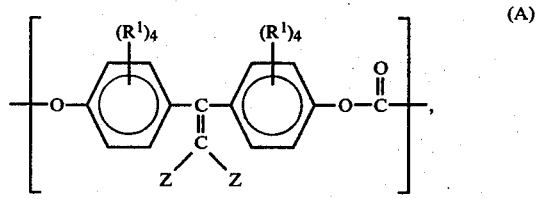

where independently each $R^1$ and Z are as defined hereinbefore, to (b) about 99-0 parts by weight of arene carbonate units of the formula:

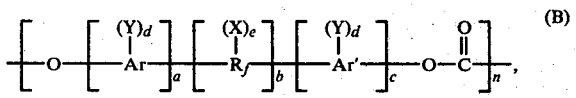

wherein $R_f$ is an alkylene, alkylidene, cycloalkylene, cycloalkylidene or arylene linkage or a mixture thereof, a linkage selected from the group consisting of ether, carbonyl, amine, a sulfur or phosphorus containing linkage, Ar and Ar' are arene radicals, Y is a substituent selected from the group consisting of organic, inorganic and organometallic radicals, X is a monovalent hydrocarbon group selected from the class consisting of alkyl, aryl and cycloalkyl and mixtures thereof, d represents a whole number of at least 0 up to a maximum equivalent to the number of replaceable hydrogens substituted on the aromatic rings comprising Ar or Ar', e represents a whole number of from 0 to a maximum controlled by the number of replaceable hydrogens on $R_f$; a, b and c represent whole numbers including 0, when b is not zero, neither a or c may be zero, otherwise either a or c but not both may be 0, when b is zero, the aromatic groups can be joined by direct carbon bonds and wherein n is an integer of at least 1.

6. The claim 1 composition, wherein (II) the polyetheramide-imide is of the formula:

$$[A]_p[B]_{1-p} \quad [C]_b \quad (IV)$$

polyetheramide-imide resin    epoxy resin wherein A represents a polyamide (polyamic acid) structural unit of the polyetheramide-imide, B repesents a polyimide structural unit of the polyetheramide-imide, wherein the polymer mole fraction p represents a number equal to or greater than zero, preferably a number less than about 0.5.

7. The claim 6 composition wherein the polyetheramide-imide is of formula (II) said polyamide units is of the formula:

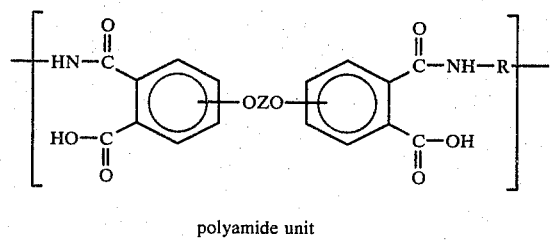

polyamide unit and said polyimide unit is of the formula:

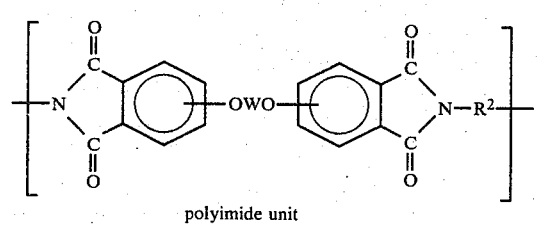

polyimide unit

The O—W—O units of the polyamide or polyimide units can be in the 3 or 3' or 4 or 4' positions, e.g., in the 3,3'-, 3,4'-, 4,3'- or the 4,4'-positions, and W is a member of the class
consisting of (1)

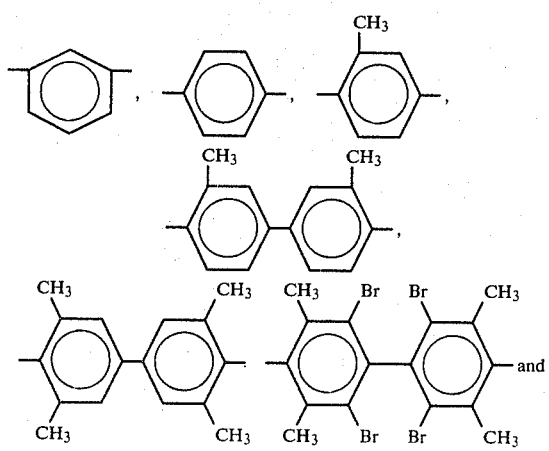
and

-continued
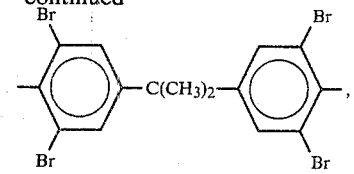

and (2) divalent organic radicals of the general formula

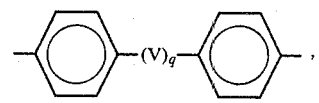

where V is a member selected from the class consisting of divalent radicals of the formulas

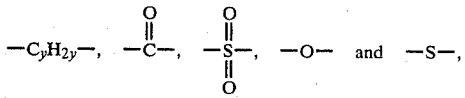

where q is 0 or 1, y is a whole number from 1 to 5, the divalent bonds of the —O—W—O— radical being situated on phthalic anhydride-derived units, and $R^2$ is a divalent organic radical selected from the class consisting of (a) aromatic hydrocarbon radicals having from 6–20 carbon atoms and halogenated derivatives thereof, (b) alkylene radicals and cycloalkylene radicals having from 2–20 carbon atoms, $C_{(2-8)}$ alkylene terminated polydiorganosiloxane, and (c) divalent radicals included by the formula

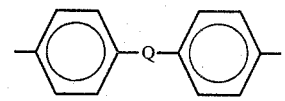

where Q is a member selected from the class consisting of

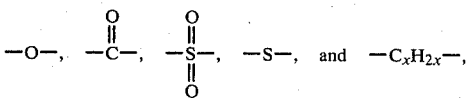

and x is a whole number from 1 to 5 inclusive.

8. The blend of claim 7, wherein the polyetheramide-imide of formula (II) "p" is at least equal to the number 0.5.

9. The claim 8 blend, wherein the polyetheramide-imide of (II) has an intrinsic viscosity greater than about 0.15 deciliters per gram.

10. The claim 9 blend, wherein the poletheramide-imide of (II) "p" is from 0.5–0.95.

11. The claim 10 blend, wherein the polyetheramide-imide of (II), the O—W—O units of said polyamide or said poly-imide units are situated in the 3,3'-, 3,4'-, 4,3'- or the 4,4'- positions and W is the divalent radical of the general formula:

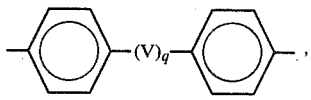

where V is a divalent radical of the formula

where y is a whole number from 1 to 5.

* * * * *